United States Patent
Kim et al.

(10) Patent No.: US 7,663,322 B2
(45) Date of Patent: Feb. 16, 2010

(54) BACKLIGHT DRIVING SYSTEM FOR LIQUID CRYSTAL DISPLAY

(75) Inventors: Jin Wook Kim, Seoul (KR); Dong Seong Oh, Inchun (KR); Jong Duck Kim, Daejeon (KR); Sug Chin Sakong, Seoul (KR); Sung Soo Hong, Seoul (KR); Sang Kyoo Han, Daejeon (KR); Chung Wook Roh, Daejeon (KR); Dea Min Jang, Gyunggi-Do (KR); Sung Ho Kim, Gyunggi-Do (KR); Jin Woo Cho, Gyunggi-Do (KR); Kwang Seung Cho, Gyunggi-Do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 12/044,683

(22) Filed: Mar. 7, 2008

(65) Prior Publication Data

US 2009/0021179 A1 Jan. 22, 2009

(30) Foreign Application Priority Data

Jul. 20, 2007 (KR) .................. 10-2007-0072605
Nov. 26, 2007 (KR) .................. 10-2007-0120917

(51) Int. Cl.
*H05B 41/16* (2006.01)

(52) U.S. Cl. .................. 315/276; 315/225; 315/274; 315/282

(58) Field of Classification Search ............ 315/209 R, 315/224, 274, 276, 291, 225, 282; 363/152, 363/172; 345/102

See application file for complete search history.

(56) References Cited

U.S. PATENT DOCUMENTS 4,030,014 A * 6/1977 Chana et al. .............. 363/24
5,206,800 A * 4/1993 Smith ..................... 363/21.14

(Continued)

FOREIGN PATENT DOCUMENTS

KR 2003-0003684 A 1/2003

(Continued)

OTHER PUBLICATIONS

Korean Intellectual Property Office, Office Action mailed Apr. 4, 2008 and English Translation.

*Primary Examiner*—David Hung Vu
*Assistant Examiner*—Tung X Le
(74) *Attorney, Agent, or Firm*—Lowe Hauptman Ham & Berner

(57) ABSTRACT

There is provided a backlight driving system for a liquid crystal display that can reduce size and weight of a product because a DC-DC converter is not used when commercial AC power is converted into lamp driving power. A backlight driving system for a liquid crystal display according to an aspect of the invention includes a power supply unit converting commercial alternating current (AC) power into direct current (DC) power having a voltage level set beforehand, an inverter unit converting the DC power from the power supply unit into AC power at a one-to-one conversion ratio set beforehand, a boosting unit boosting the AC power from the inverter unit into lamp lighting power set beforehand; and a lamp group receiving the lamp lighting power from the boosting unit to emit light.

11 Claims, 8 Drawing Sheets

U.S. PATENT DOCUMENTS

| | | | |
|---|---|---|---|
| 5,872,429 A * | 2/1999 | Xia et al. | 315/194 |
| 6,362,575 B1 * | 3/2002 | Chang et al. | 315/224 |
| 7,378,801 B2 * | 5/2008 | Jeon | 315/209 R |
| 7,449,842 B2 * | 11/2008 | Miyazaki et al. | 315/276 |
| 2003/0156435 A1 * | 8/2003 | Morimoto et al. | 363/21.01 |
| 2004/0145584 A1 | 7/2004 | Lee et al. | |
| 2004/0207339 A1 | 10/2004 | Lin et al. | |
| 2005/0105305 A1 * | 5/2005 | Sawada et al. | 363/34 |
| 2005/0237010 A1 | 10/2005 | Ying et al. | |
| 2006/0125414 A1 * | 6/2006 | Oda et al. | 315/276 |
| 2007/0114953 A1 * | 5/2007 | Kim et al. | 315/307 |
| 2007/0146565 A1 | 6/2007 | Jeon et al. | |
| 2007/0190890 A1 * | 8/2007 | Hsu et al. | 445/69 |

FOREIGN PATENT DOCUMENTS

| | | |
|---|---|---|
| KR | 10-2007-0055319 A | 5/2007 |
| KR | 10-2007-0068804 A | 7/2007 |
| KR | 2007-0096242 A | 10/2007 |

* cited by examiner

BACKLIGHT DRIVING SYSTEM FOR LIQUID CRYSTAL DISPLAY

CROSS-REFERENCE TO RELATED APPLICATIONS

This application claims the priority of Korean Patent Application No. 2007-72605 filed on Jul. 20, 2007 and Korean Patent Application No. 2007-120917 filed on Nov. 26, 2007, in the Korean Intellectual Property Office, the disclosures of which are incorporated herein by reference.

BACKGROUND OF THE INVENTION

1. Field of the Invention

The present invention relates to a backlight driving system for a liquid crystal display, and more particularly, to a backlight driving system for a liquid crystal display that can reduce size and weight of a product because a DC-DC converter is not used when commercial AC power is converted into lamp driving power.

2. Description of the Related Art

In recent years, liquid crystal displays are generally used in a variety of display devices, such as monitors and televisions, so as to provide small, lightweight and thin LCD products.

These LCD products inevitably use LCD backlight driving systems that light lamps of the LCDs and output necessary light.

FIG. 1 is a configuration view illustrating a backlight driving system according to the related art.

Referring to FIG. 1, a backlight driving system 10 according to the related art includes an alternating-current (AC) to direct-current (DC) converter 11, a DC-DC converter 12, an inverter unit 13, and a plurality of lamps 14. The AC to DC converter 11 converts commercial AC power to DC power of DC 400V. The DC to DC converter 12 converts the DC 400V from the AC to DC converter 11 to DC 24V. The inverter unit 13 converts the DC 24V from the DC-DC converter 12 into lamp lighting power of approximately AC 2700 vp-p. The plurality of lamps 14 emit light according to the lamp light power from the inverter unit 13.

The above-described backlight driving system 10 according to the related art converts the commercial AC power into the lamp lighting power in order of AC-DC-DC-AC, which reduces power conversion efficiency and complicates a power conversion structure.

SUMMARY OF THE INVENTION

An aspect of the present invention provides a backlight driving system for a light crystal display that can reduce size and weight of a product because a DC-DC converter is not used when commercial AC power is converted into lamp driving power.

According to an aspect of the present invention, there is provided a backlight driving system for a liquid crystal display, the system including: a power supply unit converting commercial alternating current (AC) power into direct current (DC) power having a voltage level set beforehand, an inverter unit converting the DC power from the power supply unit into AC power at a one-to-one conversion ratio set beforehand, a boosting unit boosting the AC power from the inverter unit into lamp lighting power set beforehand; and a lamp group receiving the lamp lighting power from the boosting unit to emit light.

The system may include a first board having a mounting region set beforehand a second board physically separated from the first board and having a mounting region set beforehand, wherein the power supply unit and the inverter unit are mounted to the first board, and the boosting unit is mounted to the second board.

The power supply unit may include an electromagnetic interference (EMI) suppression filter removing electromagnetic interference of the commercial AC power, a rectifier smoothing and rectifying the AC power through the EMI suppression filter, and a power factor corrector performing power factor correction of the AC power rectified by the rectifier to convert the corrected power to the DC power, the inverter unit may include a switch switching the power corrected by the power factor corrector, and a one-to-one transformer converting the power switched by the switch into AC power having the same voltage level as the voltage level of the DC power according to the same winding ratio set beforehand, and the boosting unit may include a distribution transformer boosting the AC power from the one-to-one transformer to the lamp lighting power according to a winding ratio set beforehand and distributing the lamp lighting power to lamps.

The one-to-one transformer may transmit the AC power to the distribution transformer through a cable.

The distribution transformer may be a one-to-one distribution transformer that transmits the lamp lighting power to one lamp or a one-to-many distribution transformer that transmits the lamp lighting power to at least two lamps.

The switch of the inverter may perform a switching operation by using any one of a full-bridge method, a half-bridge method, and a push-pull method.

The first board may include a primary ground having a ground region set beforehand and a secondary ground having a ground region isolated from that of the primary ground, and the EMI suppression filter, the rectifier, the power factor corrector, the switch, and a primary side of the one-to-one transformer may be grounded to the primary ground, and a secondary side of the one-to-one transformer may be grounded to the secondary ground.

The lamp group may include at least one external electrode fluorescent lamp, and the external electrode fluorescent lamp may receive the lamp lighting power from the boosting unit to emit light.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
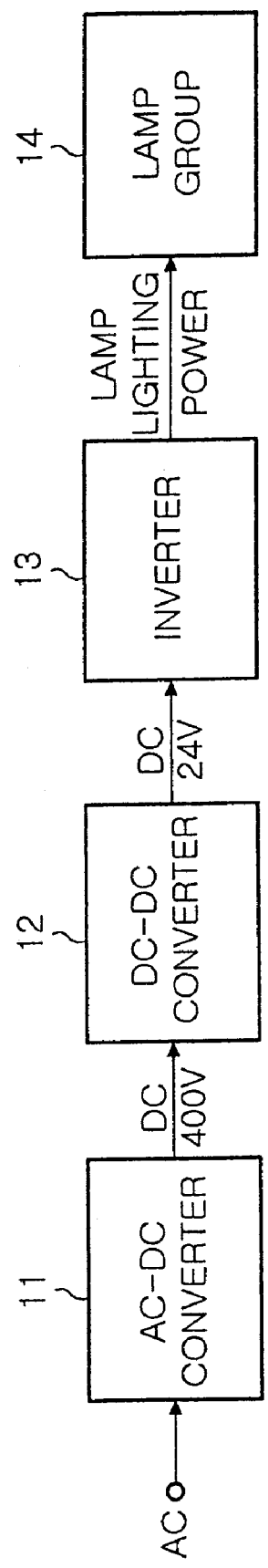
FIG. 1 is a configuration view illustrating a backlight driving system according to the related art.
Figure 2:
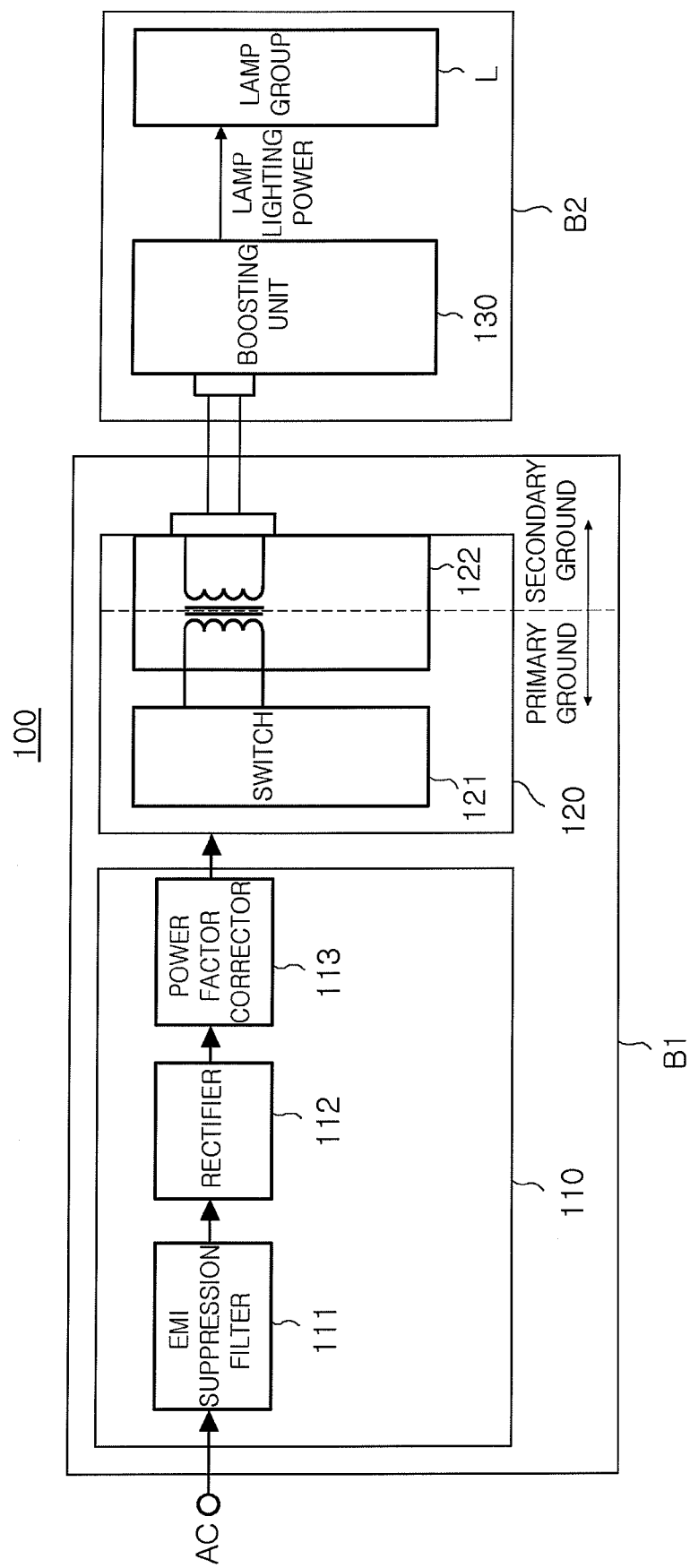
FIG. 2 is a configuration view illustrating a backlight driving system according to an exemplary embodiment of the present invention.

FIG. 2 is a configuration view illustrating a backlight driving system according to an exemplary embodiment of the present invention.

Referring to FIG. 2, a backlight driving system 100 according to an exemplary embodiment of the invention includes a power supply unit 110, an inverter unit 120, and a boosting unit 130.

The backlight driving system 100 according to the exemplary embodiment of the invention may be formed at a first board B1 that has a mounting region set beforehand and a second board B2 that is physically separated from the first board B1 and has a mounting region set beforehand. Here, the power supply unit 110 and the inverter unit 120 may be mounted to the first board B1, and the boosting unit 130 may be mounted to the second board B2.

The power supply unit 110 includes an EMI suppression filter 111 that removes electromagnetic interference (EMI) from commercial alternating current (AC) power, a rectifier 112 that rectifies and smoothes the AC power from which the EMI is removed by the EMI suppression filter 111, and a power factor corrector 113 that performs power factor correction of the power rectified by the rectifier 112 to convert the corrected power into direct current (DC) power set beforehand.

The inverter unit 120 includes a switch 121 and a one-to-one transformer 122. The switch 121 switches the DC power from the power factor corrector 113 by a method set beforehand. The one-to-one transformer 122 converts the power switched by the switch 121 into AC power having the same voltage level as the DC power according to a winding ratio set beforehand. That is, when the DC power has a voltage level of DC 400V, the one-to-one transformer 122 converts the DC power into the AC power having a voltage level of 400 Vp-p.

The switch 121 can perform the switching operation by a full-bridge method, a half-bridge method, or a push-pull method.

The one-to-one transformer 122 may be divided into a primary side that has a coil having a winding number set beforehand and a secondary side that has a coil having the same winding number as the coil at the primary side.

Meanwhile, the first board B1 may include a primary ground that has a ground region set beforehand and a secondary ground that has a different ground region from the ground region of the primary ground. The EMI suppression filter 111, the rectifier 112, the power factor corrector 113, the switch 121, and the primary side of the one-to-one transformer 122 may be grounded to the primary ground, while the secondary side of the one-to-one transformer 122 may be grounded to the secondary ground.

The boosting unit 130 and a lamp group L may be mounted to the second board B2.

Since the first board B1 and the second board B2 are physically separated from each other, the one-to-one transformer 122 of the inverter unit 120 transmits the AC power to the boosting unit 130 through a cable C. Since the AC power has the voltage level of approximately 400 Vp-p, a cable for low voltage is used to thereby reduce costs.

Figure 3:
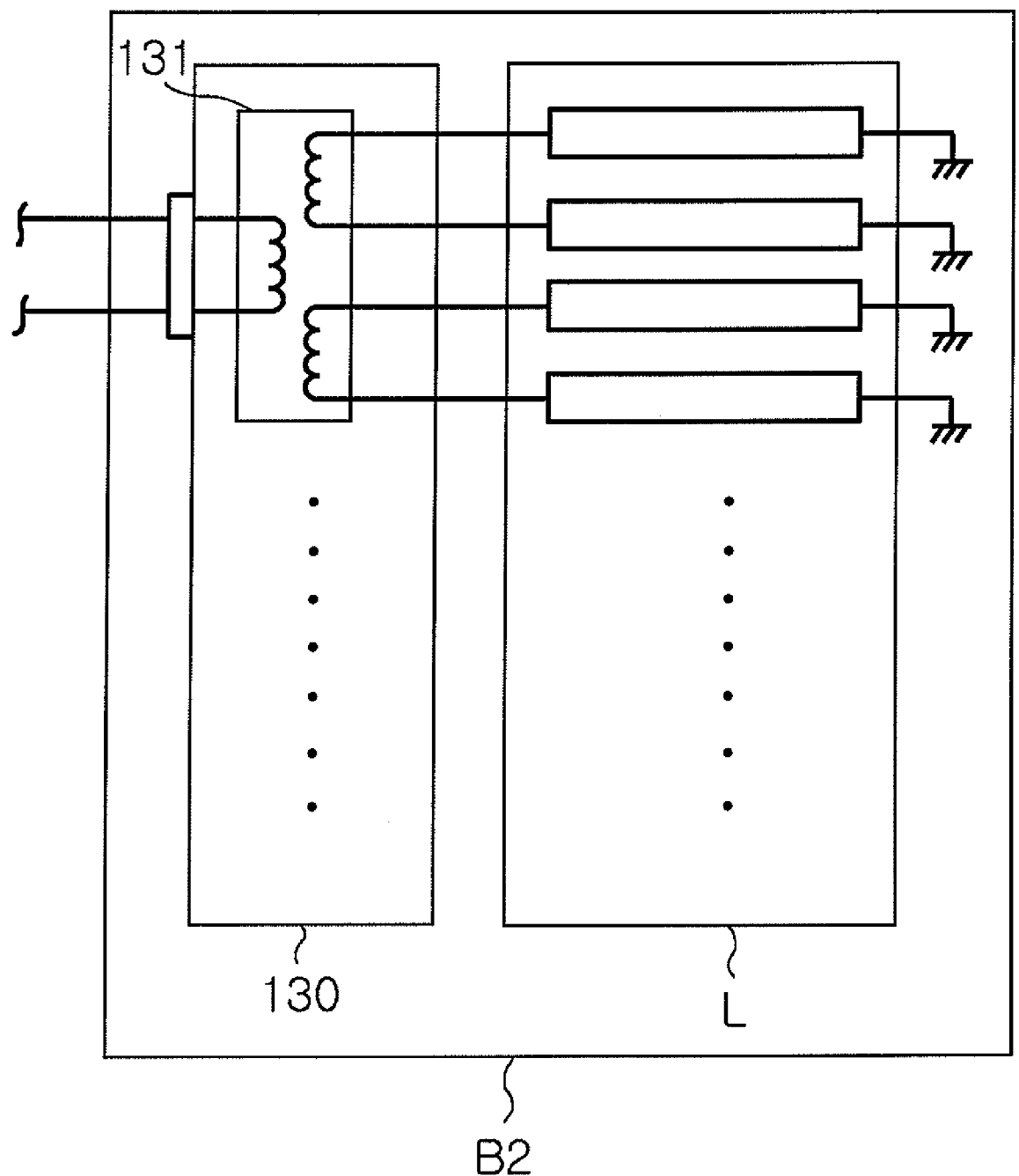
FIG. 3 is a view illustrating a boosting unit that is used in the backlight driving system according to the exemplary embodiment of the present invention.

FIG. 3 is a view illustrating a boosting unit that is used in the backlight driving system according to the exemplary embodiment of the present invention.

Referring to FIG. 3, the boosting unit 130 used in the backlight driving system 100 according to the embodiment of the invention may include a distribution transformer 131. The distribution transformer 131 boosts the AC power through the cable C to distribute the boosted power to lamps of the lamp group L.

At this time, the distribution transformer 131 may include a primary coil and at least one secondary coil. The primary coil has a winding number set beforehand and receives the AC power. The secondary coil has a higher winding number than the primary coil to boost the AC power from the primary coil and convert the boosted AC power into lamp lighting power.

The distribution transformer 131 may be a one-to-one distribution transformer that has one end of the secondary coil connected to one of the lamps in the lamp group L to transmit the lamp lighting power to the lamp, or a one-to-two distribution transformer that has one end and the other end of the secondary coil connected to two of the lamps of the lamp group L to transmit the lamp lighting power to the two lamps.

Further, as shown in FIG. 3, the distribution transformer 131 may be a one-to-four distribution transformer that includes one primary coil and two secondary coils and connected to four of the lamps of the lamp group L to transmit the lamp lighting power to the four lamps.

Further, the distribution transformer 131 may be formed of any one of various kinds of distribution transformers, such as a one-to-eight distribution transformer that has one primary coil and four secondary coils to transmit the lamp lighting power to eight lamps and a one-to-sixteenth distribution transformer that has one primary coil and eight secondary coils to transmit the lamp light power to sixteen lamps.

As described above, in the backlight driving system 100 according to the exemplary embodiment of the invention, the power supply unit 110 and the inverter unit 120 are mounted to the first board B1, and the boosting unit 130 is mounted to the second board B2. That is, the boosting unit 130 that outputs the lamp lighting power having a high voltage level of approximately 2700 Vp-p to the lamps is physically separated from the power supply unit 110 and the inverter unit 120 that use the commercial AC power and the DC power having relatively low voltage levels. Therefore, the power supply unit 110 and the inverter unit 120 are not affected by the electromagnetic interference generated in the boosting unit 130. Further, since the volume of components used in the boosting unit 130 that uses a high voltage is larger than that of components used in the power supply unit 110 and the inverter unit 120 that use a low voltage, the power supply unit 110 and the inverter unit 120, and the boosting unit 130 are mounted to the different boards to thereby reduce the product size.

Further, the one-to-one transformer 122 that is used in the inverter unit 120 generates the AC power of 400 Vp-p that has the same voltage level as the DC power of 400V from the power supply unit 110. That is, the one-to-one transformer 122 uses low-voltage power to reduce the safety distance, such that the volume of the transformer can be reduced.

Figure 4:
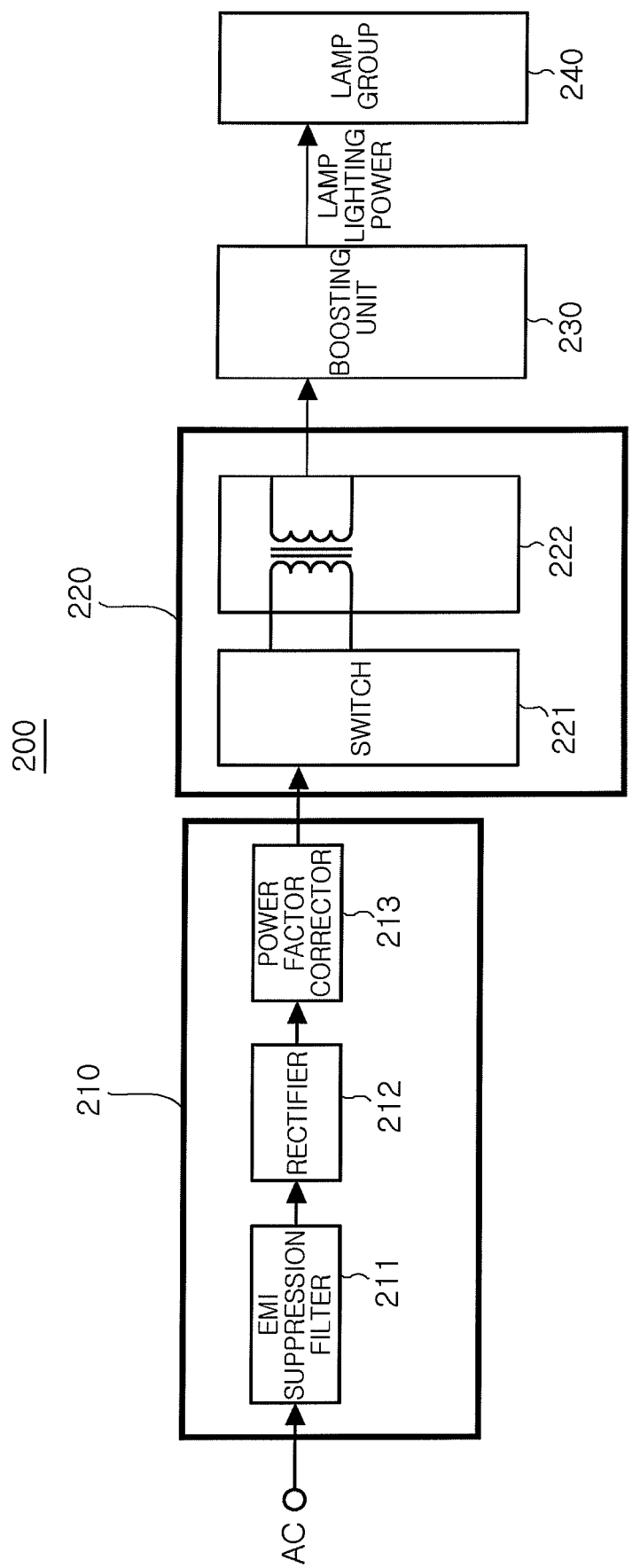
FIG. 4 is a configuration view illustrating a backlight driving system according to another exemplary embodiment of the present invention.

FIG. 4 is a configuration view illustrating a backlight driving system according to another exemplary embodiment of the present invention.

Referring to FIG. 4, a backlight driving system 200 according to another exemplary embodiment of the invention includes a power supply unit 210, an inverter unit 220, and a boosting unit 230 like the configuration shown in FIG. 2.

Since the power supply unit 210, the inverter unit 220, and the boosting unit 230, shown in FIG. 4, are the same as those shown in FIG. 2 except for the fact that the technique that connects the cable and separates the boards is not applied, a detailed description thereof will be omitted.

Figure 5:
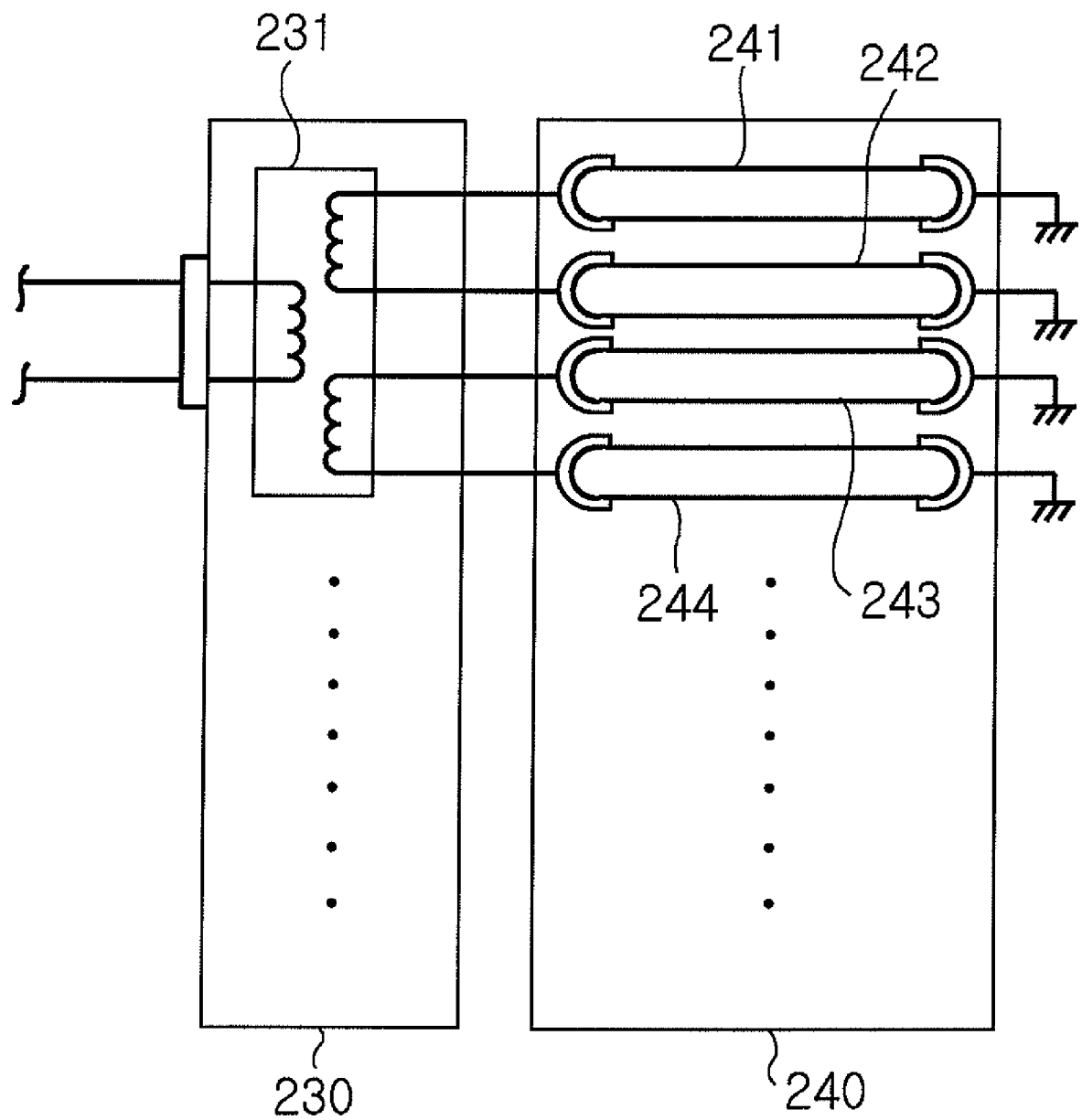
FIG. 5 is a view illustrating a boosting unit that is used in the backlight driving system according to another exemplary embodiment of the present invention.

FIG. 5 is a view illustrating a boosting unit that is used in the backlight driving system according to another exemplary embodiment of the present invention.

Referring to FIG. 5, the boosting unit 230 used in the backlight driving system 200 according to another exemplary embodiment of the invention may include a distribution transformer 231. The distribution transformer 231 boosts the AC power to transmit the boosted power to lamps of a lamp group 240.

The distribution transformer 231 may be a one-to-one distribution transformer that has one end of a secondary coil connected to one of external electrode fluorescent lamps of the lamp group 240 to transmit the lamp lighting power to the lamp, or a one-to-two distribution transformer that has one end and the other end of the secondary coil connected to two of the external electrode fluorescent lamps of the lamp group 240 to transmit the lamp lighting power to the two lamps.

Further, as shown in FIG. 5, the distribution transformer 231 may be a one-to-four distribution transformer that has one primary coil and two secondary coils. Here, ends of the secondary coils are connected to four external electrode fluorescent lamps 241, 242, 243, and 244, respectively, of the lamp group 240 to transmit the lamp lighting power to the four lamps.

Further, the distribution transformer 231 may be formed of any one of various kinds of distribution transformers, such as a one-to-eight distribution transformer that has one primary coil and four secondary coils to transmit the lamp lighting power to eight lamps and a one-to-sixteenth distribution transformer that has one primary coil and eight secondary coils to transmit the lamp light power to sixteen lamps.

Further, since the backlight driving system 200 according to another exemplary embodiment of the invention uses the external electrode fluorescent lamps, a current balancing circuit that is necessarily used when cold cathode fluorescent lamps can be removed to thereby reduce the circuit area and manufacturing costs.

A technique that maintains the current balancing when external electrode fluorescent lamps are used will be described with reference to the accompanying drawings.

Figure 6A:
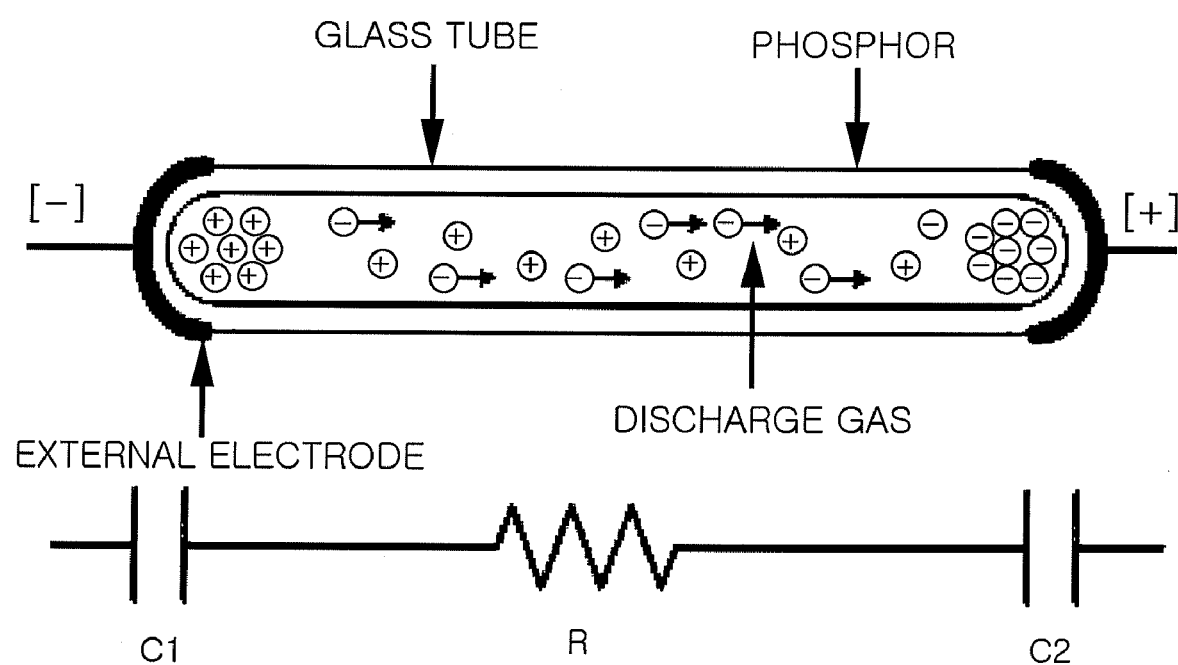
FIG. 6A is a view illustrating an external electrode fluorescent lamp that is used in the backlight driving system according to another exemplary embodiment of the present invention.
Figure 6B:
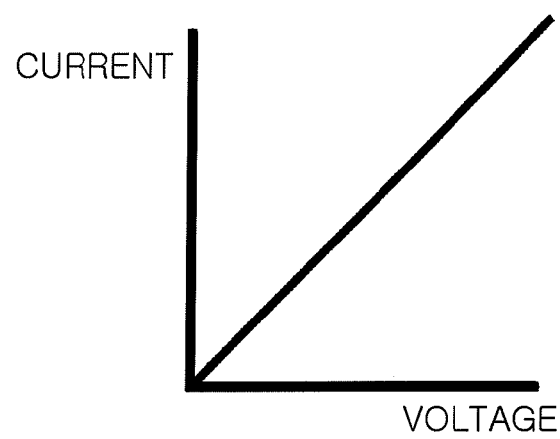
FIG. 6B is a graph illustrating positive resistance characteristics of an external electrode fluorescent lamp.

FIG. 6A is a view illustrating an external electrode fluorescent lamp that is used in a backlight driving system according to an exemplary embodiment of the present invention. FIG. 6B is a graph illustrating positive resistance characteristics of the external electrode fluorescent lamp.

Referring to FIG. 6A, the external electrode fluorescent lamp includes a phosphor and a discharge gas in a glass tube having a bar shape. External electrodes are formed at both end portions of the glass tube.

This can be represented as an equivalent circuit by using a resistor R and capacitors C1 and C2 formed at both ends of the resistor R. That is, in general, a current balancing circuit is formed of resistors and capacitors. As described above, the external electrodes can be analyzed as equivalent to the capacitors C1 and C2, a current balancing circuit is not separately required. Though not shown in FIG. 6A, a flat light source having external electrodes can be used.

Figure 6C:
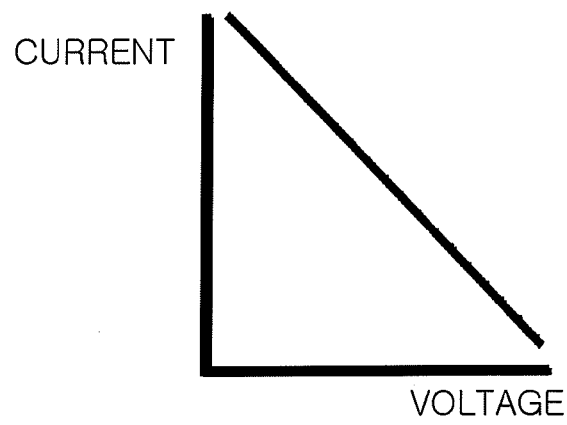
FIG. 6C is a graph illustrating negative resistance characteristics of a cold cathode fluorescent lamp.

Further, referring to FIG. 6B, in the external electrode fluorescent lamp, a tube voltage and a tube current are in proportion to each other. Since the external electrode fluorescent lamp has positive resistance characteristics, a separate current balancing circuit is not required like a cold cathode fluorescent lamp that has negative resistance characteristics as shown in FIG. 6C.

Figure 7:
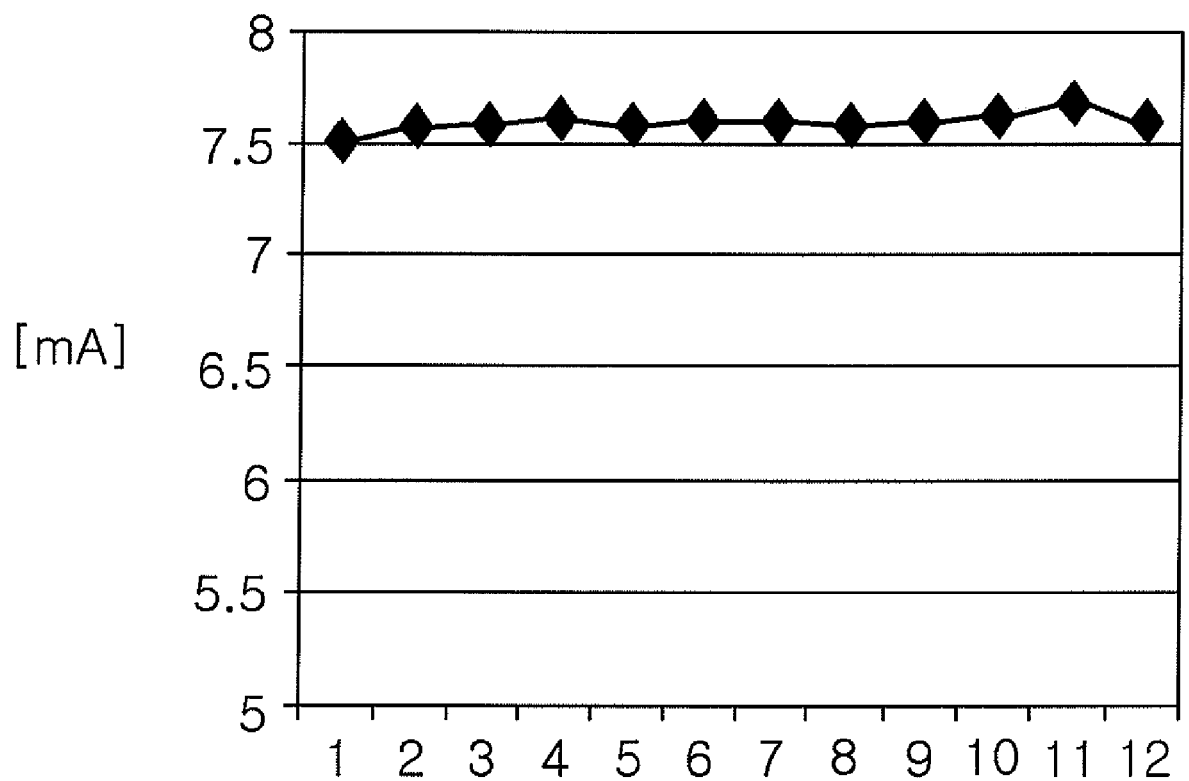
FIG. 7 is a graph illustrating deviation in current among lamps in a backlight driving system according to an exemplary embodiment of the present invention.

FIG. 7 is a graph illustrating deviation in current among lamps of a backlight driving system according to an exemplary embodiment of the present invention.

Referring to FIG. 7, in the backlight driving systems 100 and 200 according to the exemplary embodiments of the invention, when lamp lighting power is transmitted to approximately twelve lamps, a root mean square (RMS) value of the lamp lighting power that is transmitted to each of the lamps is in a range of 7.5 mA to 8 mA. That is, it can be seen that the current balancing is maintained on the basis of the current value of the lamp lighting power that is supplied to each of the lamps.

As set forth above, according to exemplary embodiments of the invention, the size and weight of the product can be reduced and the material cost can be significantly reduced because a DC-DC converter is not used when commercial AC power is converted into lamp driving power. Further, since the one-to-one inverter is used in the inverter unit, a high-voltage transformer is changed to a low-voltage transformer, and thus electromagnetic interference is reduced. Further, additional material cost can be reduced because of the change to the low-voltage transformer. In addition, standardization and common use can be applied LCD with all size in inch, and the product size can be more reduced.

Further, since an external electrode fluorescent lamp (EEFL) is used instead of a cold cathode fluorescent lamp (CCFL), and thus a current balancing circuit can be removed, manufacturing costs and the product size can be more reduced. Further, since a flat fluorescent lamp (FFL) that has external electrodes may be used instead of the cold cathode fluorescent lamp (CCFL) according to the related art, the same effect may be obtained as when the external electrode fluorescent lamp (EEFL) is used.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight driving system for a liquid crystal display, the system comprising:
    a power supply unit for converting first alternating current (AC) power into direct current (DC) power having a voltage level;
    an inverter unit for converting the DC power from the power supply unit into second AC power at a one-to-one conversion ratio;
    a boosting unit for boosting the second AC power from the inverter unit into lamp lighting power; and
    at least one lamp for receiving the lamp lighting power from the boosting unit to emit light,
    wherein the inverter unit comprises:
    a switch for switching the DC power transmitted from the power supply unit; and
    a one-to-one transformer having a one-to-one winding ratio corresponding to the one-to-one voltage conversion ratio for converting the power switched by the switch into AC power having substantially the same voltage level as the voltage level of the DC power.

2. The system of claim 1, wherein
the power supply unit comprises:
an electromagnetic interference (EMI) suppression filter for removing electromagnetic interference of the first AC power;
a rectifier for smoothing and rectifying the first AC power through the EMI suppression filter; and
a power factor corrector for performing power factor correction of the first AC power rectified by the rectifier to convert the corrected first AC power to the DC power, and
the boosting unit comprises a distribution transformer converting the second AC power from the one-to-one transformer to the lamp lighting power and distributing the lamp lighting power to at least one lamp.

3. The system of claim 2, further comprising:
a first board having a first mounting region and a second board physically separated from the first board and having a second mounting region,
wherein the power supply unit and the inverter unit are mounted on the first mounting region of the first board, and the boosting unit is mounted on the second mounting region of the second board.

4. The system of claim 3, wherein the system further comprises a cable connecting the one-to-one transformer with the distribution transformer.

5. The system of claim 3, wherein the distribution transformer is a one-to-one distribution transformer for transmitting the lamp lighting power to one of the at least one lamp or a one-to-many distribution transformer for transmitting the lamp lighting power to at least two lamps.

6. The system of claim 3, wherein the switch of the inverter is a full-bridge switch, a half-bridge switch, or a push-pull switch.

7. The system of claim 3, wherein the first board comprises a primary ground having a first ground region and a secondary ground having a second ground region isolated from the first ground region of the primary ground, and
the EMI suppression filter, the rectifier, the power factor corrector, the switch, and a primary side of the one-to-one transformer are grounded to the primary ground, and a secondary side of the one-to-one transformer is grounded to the secondary ground.

8. The system of claim 1, wherein the at least one lamp comprises at least one external electrode fluorescent lamp.

9. The system of claim 8, wherein
the power supply unit comprises:
an electromagnetic interference (EMI) suppression filter for removing electromagnetic interference from the AC power;
a rectifier for smoothing and rectifying the first AC power through the EMI suppression filter; and
a power factor corrector for performing power factor correction of the first AC power rectified by the rectifier to convert the corrected first AC power into the DC power, and
the boosting unit comprises a distribution transformer for converting the second AC power from the one-to-one transformer to the lamp lighting power to distribute the lamp lighting power to the at least one lamp.

10. The system of claim 9, wherein the distribution transformer is a one-to-one distribution transformer for transmitting the lamp lighting power to the one external electrode fluorescent lamp or a one-to-many distribution transformer for transmitting the lamp lighting power to at least two external electrode fluorescent lamps.

11. The system of claim 9, wherein the switch of the inverter unit is a full-bridge switch, a half-bridge switch, or a push-pull switch.

* * * * *